PRINTED CIRCUIT STRUCTURE AND METHOD OF MAKING THE SAME

Filed June 12, 1958 3 Sheets-Sheet 1

INVENTORS
Paul L. Anderson
John A. Zagusta
BY
Robert R. Churchill
ATTORNEY

INVENTORS
Paul L. Anderson
John A. Zagusta
BY
Robert R. Churchill
ATTORNEY

Sept. 4, 1962 P. L. ANDERSON ETAL 3,052,823

PRINTED CIRCUIT STRUCTURE AND METHOD OF MAKING THE SAME

Filed June 12, 1958 3 Sheets-Sheet 3

INVENTOR.
Paul L. Anderson
John A. Zagusta
BY
Robert L. Churchill
ATTORNEY

United States Patent Office 3,052,823

Patented Sept. 4, 1962

3,052,823

PRINTED CIRCUIT STRUCTURE AND METHOD OF MAKING THE SAME

Paul L. Anderson, Rockville, Conn., and John A. Zagusta, Jackson Heights, N.Y., assignors to Rogers Corporation, Manchester, Conn., a corporation of Massachusetts Filed June 12, 1958, Ser. No. 741,680

7 Claims. (Cl. 317—101)

This invenion relates to a printed circuit structure and method of making the same.

The invention has for an object to provide a novel and improved printed circuit structure embodying a plurality of superimposed individual circuit patterns wherein novel provision is made for connecting selected of the circuit patterns in an efficient and economical manner.

Another object of the invention is to provide a novel and improved method of producing a multicircuit printed structure of the character specified.

With these general objects in view and such others as may hereinafter appear, the invention consists in the printed circuit structure and in the method of producing the same, as hereinafter described and particularly defined in the claims at the end of this specification.

Figures 1, 2, 3, 4:
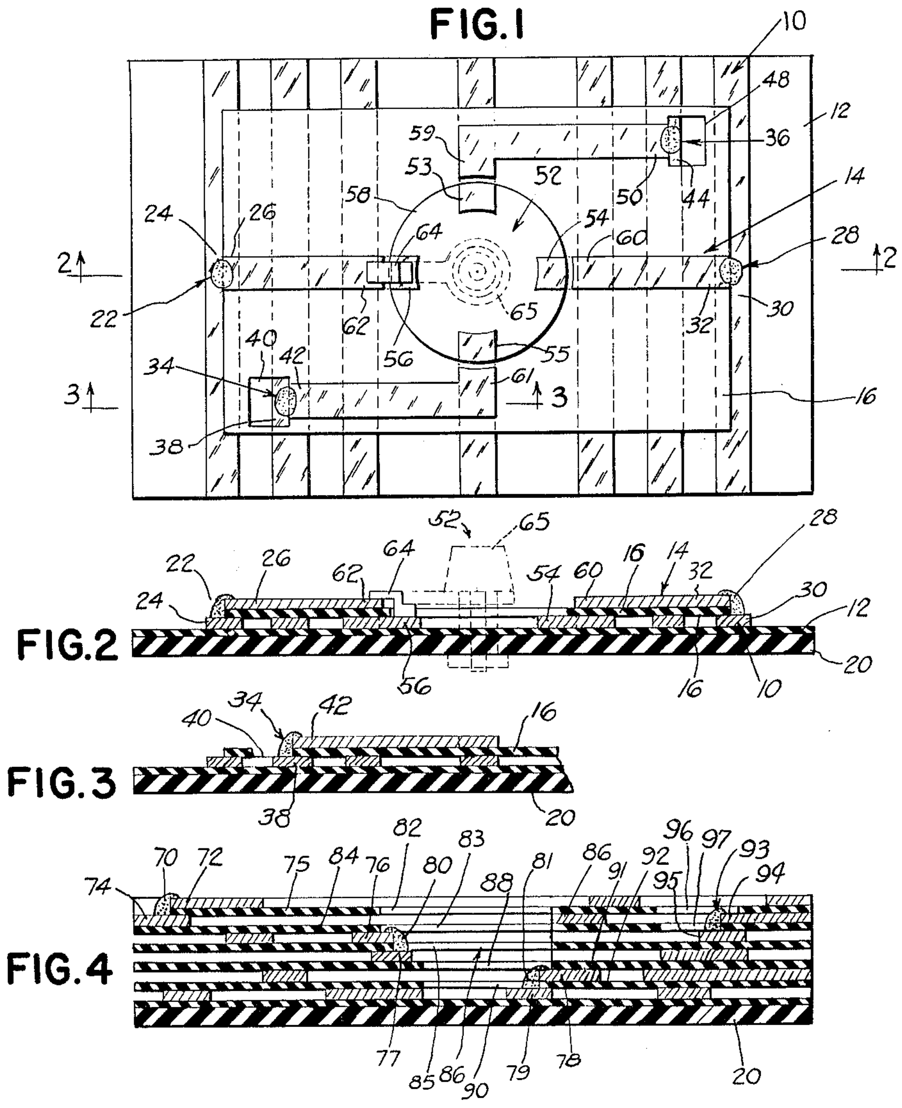
FIG. 1 is a plan view of a multicircuit printed structure embodying the present invention.
FIG. 2 is a horizontal cross section taken on the line 2—2 of FIG. 1.
FIG. 3 is a similar view taken on the line 3—3 of FIG. 1.
FIG. 4 is a cross sectional view similar to FIG. 2 illustrating a modified form of multicircuit printed structure.

In general the present invention contemplates a novel and improved printed circuit structure wherein a plurality of printed circuit patterns are superimposed one upon another in a novel manner and wherein novel means is provided for connecting selected of the superimposed circuits in an efficient and economical manner. In practice each of the individual circuits forming the present printed circuit structure may comprise a conductive circuit pattern, such as a pattern produced from a conductive foil, which is applied to a relatively thin, flexible sheet of insulating material in any known manner. Such individual sheets having the conductive pattern applied thereto may be superimposed one upon the other and secured together. Preferably, the superposed sheets may be mounted upon a relatively rigid insulating base, thus providing a printed circuit structure having a plurality of circuits arranged at different levels and separated by the relatively thin insulating sheet material upon which the individual circuits are secured.

In accordance with a feature of the present invention novel provision is made for connecting selected circuits at such different levels, and in the illustrated embodiment of the invention the thin sheets upon which the upper circuits are secured may be provided with apertures or "windows" so as to expose a portion of an underlying printed circuit to which connection is to be made, or the upper sheet or sheets may be smaller in area than the underlying sheets so as to leave uncovered portions of the underlying circuit surrounding the margins of the upper sheet or sheets to which connection is to be made. In either event, the margins of the sheet and of the apertures provide a boundary edge, and the exposed portions of the upper and lower printed circuits may then be connected by soldering, welding or by other similar means extending across such boundary edge, thereby providing an efficient and economical electrical connection between selected conductors of the printed circuits. Another expedient for connecting selected upper and lower circuits may comprise a rotary switch having a rotor shorting element which may be rotated to engage different exposed portions of the upper and lower circuits. In practice the thin insulating sheets upon which the metal foil circuit patterns are applied may comprise a transparent film material so that the various circuit patterns on the underlying sheets may be seen and traced through the upper sheets.

The relatively thin insulating sheets on which the printed circuit patterns are delineated may comprise thin layers or sheets of dielectric film of a plastic material, such as "nylon," "Dacron," "Teflon" or "Orlon," and the printed circuit patterns may be delineated thereon by any of the conventional processes, such as by etching foil; plating of a pattern to a thin base; mechanical delineation, such as stamping; plating a pattern onto a transfer and transferring; or any other known means for generating a conductive pattern.

In one embodiment of the invention the thin layers embodying the printed circuit patterns may be adhesively secured one upon another and to a base member to produce a unitary structure embodying a plurality of superimposed circuits.

In another embodiment of the invention, the base member and the dielectric sheets may comprise materials capable of being cured in a mold by heat and pressure to produce a laminated printed multicircuit structure.

Figure 5:
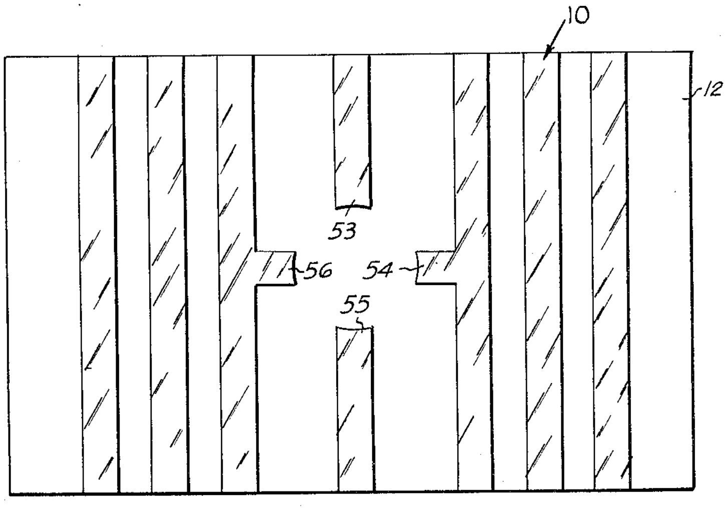
FIGS. 5 and 6 are detail plan views of the individual printed circuits shown superimposed in FIG. 1.
Figure 6:
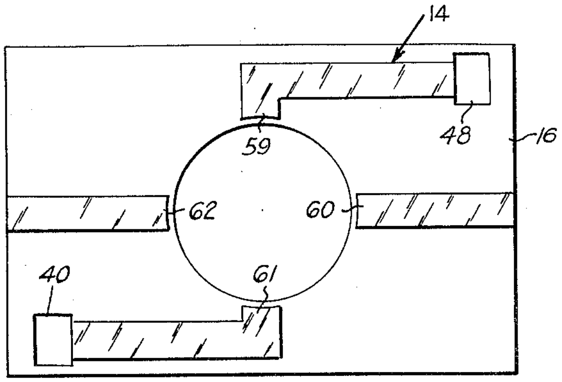

Referring now to the drawings, in one embodiment of the invention the multicircuit structure shown in FIG. 1 embodies two printed circuits comprising a lower printed circuit, indicated generally at 10, delineated on a thin insulating film or sheet 12 and an upper printed circuit, indicated generally at 14, also delineated on a thin insulating film or sheet 16. The individual printed circuits, as shown in FIGS. 5 and 6, are typical of printed circuits having portions which are desired to be connected, and the circuits are assembled one over the other upon a relatively rigid base member which may comprise an insulating base 20. The underlying plastic sheet 12 having the printed circuit 10 delineated thereon may be first adhesively secured to the base member 20 with the sheet 12 entirely covering the base member, as shown. The upper sheet 16 having the printed circuit 14 delineated thereon may then be superimposed upon and adhesively secured to the underlying sheet 12.

In the illustrated embodiment of the invention the upper sheet 16 is shown as being smaller in area than the underlying sheet, thereby exposing portions of the circuit on the underlying sheet adjacent the edges of the upper sheet and its circuit to which an electrical connection is to be made. The upper sheet 16 is also provided with apertures or "windows" cut therein exposing different portions of the printed circuit on the underlying sheet which are to be connected to portions of the printed circuit on the upper sheet. In assembling the upper and lower sheets the upper sheet is placed in a predetermined position relative to the lower sheet such that the portions of the upper and lower circuits which are to be connected to each other are aligned.

As illustrated in FIG. 1, a connection may be made, as indicated at 22, between an exposed portion 24 of the underlying circuit, adjacent one edge of the upper sheet, and an end portion 26 of the circuit on the upper sheet, such connection preferably being made by applying solder between the circuit portions 24, 26 as shown. A similar edge connection indicated at 28 may be made between circuit portions 30, 32 of the lower and upper circuits respectively.

Typical aperture or "window" connections are indicated at 34, 36 wherein the connection 34 is made between a portion 38 of the underlying circuit exposed by an aperture 40 in the upper sheet 16 and a portion 42 of the upper circuit. The connection 36 is similarly made between a portion 44 of the underlying circuit exposed by an aperture 48 in the upper sheet and a portion 50 of the upper circuit.

The present printed circuit structure of multicircuits having upper and lower superimposed circuits also enables the upper and lower circuits to be conveniently connected to one another by rotor shorting elements. A typical rotor switch connection indicated generally at 52 in FIG. 1 includes spaced radial circuit portions 53, 54, 55, 56 of the underlying circuit exposed by a circular aperture 58 in the upper film 16, and similarly spaced complemental circuit portions 59, 60, 61, 62 of the upper circuit. Aligned portions of the upper and lower circuits may be connected by a rotor shorting element 64 carried by a rotor 65 of a switch indicated in dot and dash lines in FIG. 1.

In a preferred embodiment of the invention the film or sheet upon which the circuit patterns are delineated may comprise plastic materials which are commercially available on the market under the trade names of "Orlon," "Dacron," "nylon," or "Teflon." The sheet material is preferably coated on both sides with a resin to form a relatively tough, resilient insulating sheet having an overall thickness of about but not limited to 0.005".

It is preferred to utilize thermosetting resins in the coating treatment of the sheet, and such resins may be of the heat or pressure curable type or may be of the heat and pressure curable type. Such resins include epoxy resins, phenolic resins, melamine resins, phenol formaldehyde resins and melamine formaldehyde resins. The conductive pattern delineated on the sheet may comprise a metallic or nonmetallic conductive material capable of being joined to an adjacent conductive pattern by suitable means, such as by soldering, welding or plating across a narrow gap, and such conductive pattern may be in the order of about .003 thousandths of an inch in thickness. When such relatively thin sheets having the conductive circuit pattern delineated thereon are assembled in superimposed relation upon one another with the apertures cut in the overlying sheets in the desired locations, the patterns of the underlying sheets which are exposed through the apertures are separated from the patterns of the upper sheets by a distance equal to the thickness of the upper sheet or sheets. This results in the formation of a relatively small gap between adjacent portions of the circuit patterns which may be easily bridged and the patterns joined by soldering, welding or plating to thereby provide an efficient and economical electrical connection.

In the cross sectional views, FIGS. 2, 3 and 4, the vertical dimensions and proportions of the elements shown have been greatly enlarged for clearness of illustration. Actually, the thickness of the elements, as above described, is such that the circuit carrying sheets are in contacting relation, and in practice the sheets may be pressed or molded together so that an exposed portion of an underlying circuit pattern may be pressed upwardly a short distance into an apertured portion of an overlying sheet, thereby reducing the gap between adjacent portions of the upper and lower conductors forming the circuits to enable the gap to be bridged or joined in an efficient manner.

The base member 20 is preferably of insulating material, and when the lowermost circuit carrying sheet 12 completely covers the base member, as shown in FIG. 2, the dielectric properties of the base member are greatly increased, and the base member is additionally protected from moisture or other elements which may have an adverse effect on the conductor. Thus, in practice an inexpensive base member having low dielectric properties may be utilized in the formation of the present circuit structure when the base is covered by the insulating pattern carrying sheet.

In a modified form of the invention the base member may comprise a material of high dielectric properties, and the lowermost circuit pattern may be delineated directly on to the base member in any usual or preferred manner, thus eliminating the thin insulating sheet for the lowermost circuit. Successive circuits carried by the insulating sheets may then be applied on top of and secured to the pattern carrying base member as described.

The modification shown in FIG. 4 illustrates a multicircuit structure similar to that shown in FIG. 2 except that six different circuit carrying sheets are shown superposed one upon the other and secured together. Typical connections therein shown include a soldered edge connection indicated at 70 connecting a portion 72 of the uppermost circuit to a portion 74 of an underlying circuit exposed by a cutaway edge portion of the uppermost circuit carrying sheet 75. Underlying circuits 76, 77 and 78, 79 are also shown electrically joined by solder connections 80, 81 respectively, the circuit 76 being exposed by apertures 82, 83 in the overlying circuit carrying sheets 75, 84, and circuit 77 being exposed by an aperture 85 in the circuit carrying sheet 86. Circuits 78, 79 are exposed by apertures 88, 90 cut in underlying circuit carrying sheets 91, 92. It will be apparent that apertures through one or more of the circuit carrying sheets may be provided in different portions of the multicircuit structure illustrated to expose portions of the circuits at different levels which may be conveniently connected by soldering or by a similar connection. Thus, a solder connection 93 may be provided between the circuit portions 94, 95 exposed by the apertures 96, 97 in the overlying sheets 75, 84, as illustrated.

It will be observed that the exposed portions of the different printed circuits to be solder connected present relatively large planar surface areas to which the solder may adhere whereby to provide a firm electrical bond between the connected circuits.

Figure 7:
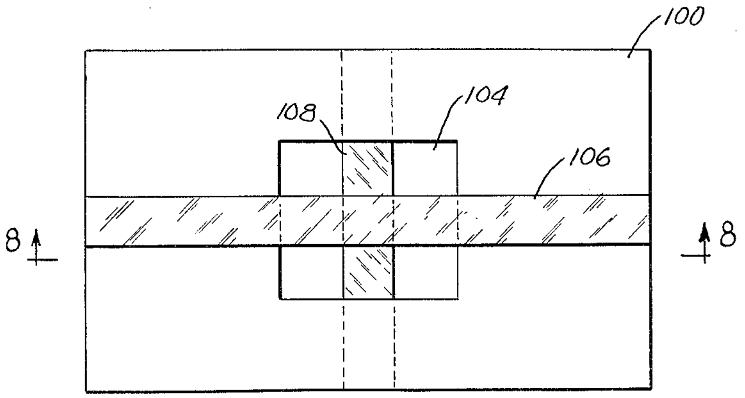
FIG. 7 is a plan view of a modified form of multicircuit structure.
Figure 8:
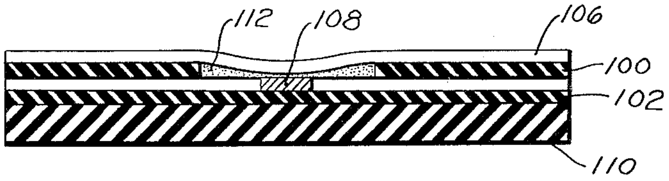
FIG. 8 is a horizontal cross sectional view taken on the line 8—8 of FIG. 7.

In a still further modified form of the invention, as illustrated in FIGS. 7 and 8, the multicircuit structure may comprise upper and lower relatively thin insulating sheets 100, 102 of the type hereintofore described. The upper sheet is provided with an aperture or window 104 formed therein, as best shown in FIG. 7. Each of the sheets 100, 102 is provided with a conductive circuit pattern 106, 108 respectively which may be delineated on or secured thereto in the manner hereintofore described. The pattern 106 is positioned on the upper sheet 100 such that a portion thereof extends across the aperture 104 in the sheet. In assembling the multicircuit structure the lower sheet 102 may be adhesively secured to a relatively rigid insulating base member 110 and the upper sheet 100 placed in a predetermined position relative to the lower sheet such that the conductive circuit patterns overlie one another within the area defined by the aperture 104. The upper and lower circuit patterns 106, 108 may be connected by soldering as indicated at 112. In order to facilitate their connection the assembly may be compressed and the patterns placed in close mechanical proximity to one another. In another manner of assembling the multicircuit structure the conductive pattern is delineated on the reverse side of an apertured relatively thin insulating sheet by stamping or in any other suitable manner such that the pattern extends across the aperture, and the combination may then be molded onto a rigid base sheet. A second circuit pattern may be delineated on the exposed surface of the assembled thin sheet such that it also extends across the aperture therein, and the upper and lower circuits may then be connected through the aperture in the manner hereintofore illustrated and described.

It will be apparent from the foregoing description that a plurality of printed circuits may be combined in one assembly and that the present invention enables the upper and lower circuits to be efficiently connected together whenever desired through the aperture in the thin insulating overlay sheet.

In the above described embodiments of the invention the printed circuits may comprise copper foil patterns adhesively secured to the relatively thin insulating sheets, and the latter may be adhesively secured to the base member and to each other in superposed relation, as described. In a modified method of producing the present multicircuit printed structure the base member 20 may comprise a moldable fibrous base embodying a curable resin which may or may not have a conductive pattern printed thereon, and the relatively thin sheets carrying the overlying conductive patterns may comprise either a cured or uncured material capable of being molded, the assembled sheets being laminated together in a mold by heat and pressure to effect curing and bonding of the assembly. While the circuit carrying material has been herein described as preferably comprising a relatively thin film or sheet of a plastic material, it is to be understood that it may comprise materials, such as cotton or other fibrous woven or unwoven material treated with a resin, as herein described, and may be of any desired thickness.

From the foregoing description it will be apparent that the present invention provides an economical and highly efficient multicircuit structure wherein the electrical and mechanical interconnection between the different circuit patterns is effected in an efficient manner and which enables a structure having any desired number of layers of circuit patterns to be produced.

While the preferred embodiment of the invention has been herein illustrated and described, it will be understood that the invention may be embodied in other forms within the scope of the following claims.

Having thus described the invention, what is claimed is:

1. A printed circuit structure, comprising: a plurality of dielectric sheets each having at least one printed conductor on an upper surface thereof, said sheets being positioned one upon the other to provide an assembly having the printed circuit conductors disposed at different levels and separated by the thickness of a dielectric sheet, an overlying sheet having an end of a first conductor exposed to view and terminating at a boundary edge of said overlying sheet, an underlying sheet having a second conductor extending beyond said boundary edge and being exposed to view, said exposed portion of said second conductor overlying and being supported by said underlying sheet, said exposed end of said first conductor overlying a portion of said second conductor; and an electrical connection extending across said boundary edge and directly interconnecting the exposed portions of said first and second conductors.

2. A printed circuit structure as defined in claim 1 wherein the uppermost sheet has its circuit entirely exposed.

3. A printed circuit structure as defined in claim 1 wherein the printed circuit assembly is mounted on a relatively rigid insulating base.

4. A printed circuit structure as defined in claim 1 wherein the electrical connection comprises a fused metal connection.

5. A printed circuit structure as defined in claim 1 wherein the circuit on the overlying sheet is entirely exposed and wherein the dimensions of the overlying sheet are reduced with respect to the underlying sheet to present a selected marginal portion thereof overlying a selected portion of the circuit on the underlying sheet so as to expose the remaining portion of the selected underlying circuit.

6. A printed circuit structure as defined in claim 1 wherein the circuit on the overlying sheet is entirely exposed and wherein the boundary edge of the overlying sheet is provided by an aperture and wherein selected portions of the circuit on an underlying sheet extend beyond the boundary edge of said aperture and are exposed to view through said aperture.

7. A printed circuit structure as defined in claim 1 wherein the circuit on the overlying sheet is entirely exposed, and wherein the boundary edge of the overlying sheet is provided by a circular aperture exposing spaced areas of the circuit on the underlying sheet, and wherein the electrical connection is provided by a rotary switch element having radially offset contact portions disposed in said aperture in bridging relation to the boundary edge of the overlying sheet and being engageable with and forming an electrical connection between selected portions of the circuits of the overlying and exposed areas of the circuit on the underlying sheets.

References Cited in the file of this patent

UNITED STATES PATENTS

| | | |
|---|---|---|
| 1,718,993 | Wermine | July 2, 1929 |
| 1,892,146 | Harshberger | Dec. 27, 1932 |
| 1,939,130 | Mills | Dec. 12, 1933 |
| 2,019,625 | O'Brien | Nov. 5, 1935 |
| 2,268,619 | Reid | Jan. 6, 1942 |
| 2,502,291 | Taylor | Mar. 28, 1950 |
| 2,581,967 | Mitchell | Jan. 8, 1952 |
| 2,616,994 | Luhn | Nov. 4, 1952 |
| 2,758,256 | Eisler | Aug. 7, 1956 |
| 2,907,925 | Parsons | Oct. 6, 1959 |
| 2,918,287 | Rosenblum | Dec. 22, 1959 |
| 2,927,251 | Jones | Mar. 1, 1960 |
| 2,961,584 | Banik | Nov. 22, 1960 |